July 20, 1926.

I. H. KAPLAN

GAME

Original Filed July 12, 1922

1,592,830

INVENTOR
Israel H. Kaplan
BY Charles G. Hensley
ATTORNEY

Patented July 20, 1926.

1,592,830

UNITED STATES PATENT OFFICE.

ISRAEL H. KAPLAN, OF BROOKLYN, NEW YORK, ASSIGNOR OF ONE-HALF TO BENJAMIN RABINOWITZ, OF BROOKLYN, NEW YORK.

GAME.

Refiled for abandoned application Serial No. 567,702, filed June 12, 1922. This application filed November 5, 1925. Serial No. 67,002.

This application is refiled for abandoned application 567,702, filed June 12, 1922, for substantially the same subject matter.

The present invention relates to a game. The object thereof is to provide a game which may be played by persons of any age but which is more especially adapted for children or persons of limited knowledge, and it is not only intended as a means of amusement but it is also adapted to familiarize the players with the hours and minutes of the day and the reading of the time on a clock or watch face, and in this respect the game is educational. It is always easy to teach the younger minds when the teaching is combined with some element of amusement and the present device is intended to teach the reading of time while providing amusement for the pupil. The game is one which may be played at home and it may with advantage be adopted in the lower or primary classes in schools as a very interesting and simple means for teaching pupils the manner of reading or telling time.

The present invention may be embodied in different forms but the basic feature resides in providing game members such as cards provided with a multiplicity of representations of the dials or faces of a time piece such as a clock or watch, and providing playing members or disks adapted to be associated with the cards and representing thereon different positions of the hands of a clock at different hours and minutes of the day. In the preferred embodiment of my invention the playing members have a key cooperating with the cards so that they will always be properly placed in relation to the cards to prevent errors in placing them.

In the drawing forming part of this application,

Figure 1:
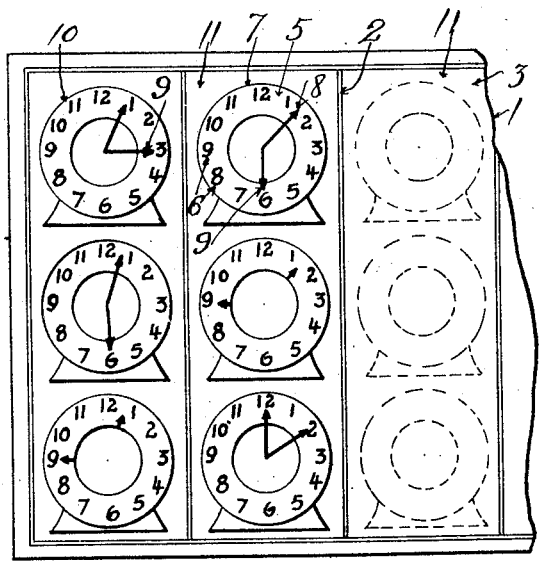
Fig. 1 shows the preferred form of my invention.
Figures 2, 3:
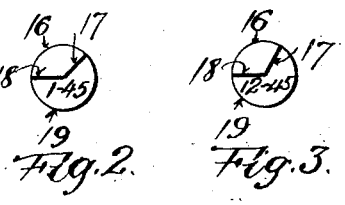
Figs. 2 and 3 show the playing discs used thereon.

Referring first to the form of my invention shown in Figures 1, 2 and 3 I have shown a member 1 which is preferably in the form of a card lined off by lines 2 to provide a number of regularly disposed spaces 3. In these spaces are pictorial representations 4 of the face or dial of a clock or other form of time piece, each picture having the circular outline 5 of a clock face or dial and having the numerals 6 arranged around the dial to represent the hour positions of a clock face or dial and having marks 7 representing the minute subdivisions of the hour. On each dial picture there is a pictorial representation of the large or minute hand 8 of a clock and at 9 there is a pictorial representation of the small or hour hand of a clock. In each of the pictorial representations of a clock dial on the several cards of the game there are hand representations having different locations representing different time readings. For instance, one dial may have the hands printed thereon corresponding with the positions of the hands of a clock at fifteen minutes past twelve o'clock. The next dial representation to the right might have the hands placed at the 1 and 6, numerals representing 30 minutes past 1 o'clock. In the preferred form of the invention there are six such dial face representations reading from left to right across each card and three reading from top to bottom in each row. In the vertical row 10 the hands on each dial representation will be set at some time designation falling between 12 and 1 o'clock. In the vertical row 11 the hands on each dial representation may be set at some time designation falling between 1 and 2 o'clock. In like manner the designations in vertical row 12 will be for time designations between 2 and 3 o'clock; for the row 13 time designations between 3 and 4 o'clock; for the row 14 time designations between 4 and 5 o'clock; and for the row 15 time designations between 5 and 6 o'clock. By arranging a second card alongside the card 1 with the columns designated in hours like the above only running from the hour 6–7 to 11–12, and with the hands arranged to designate time readings falling within these different hours, the two cards for one player will cover a period of twelve hours or one complete revolution of the hour hand of a clock. The cards used by different players will preferably have the hands on the several dials arranged to read differently, so that in all the cards of all the players there will be no duplication of time designations.

For instance, on the card of the first player and in the vertical row 10 the time designations as represented by the printed hand positions may be 12.15, 12.30, 12.45; whereas, in the card of the second player the designations as represented by the printed hands in the first row 10 may be 12.10, 12.25 and 12.40. If this scheme is carried out there will be no duplication of time designations on the whole set of cards in the entire game. This is not necessary but it is a desirable plan because it provides for a greater total of time designations and the playing members will count on one space only of all the cards.

The playing members are shown in Figures 2, 3 two such members being shown to indicate two variations or examples in time designations. These members 16 here shown as discs, each having the representations 17, 18 of a pair of hands and the disk may be marked with the numeral designation of the time such as shown at 19. In the disk 16 the hands are shown positioned for a 1.45 time designation, and this disk is likewise so marked at 19. If the disk 16 is placed on the dial representation in the first row of card 1, within the circle of hour numerals 6 the hand designations 17, 18 on the disc 16 will coincide with the hand designations 9, 8 and the whole will appear like a clock face with the hands at 1.45 o'clock.

I prefer to provide 150 of these discs each marked with different time designations though this number is only a preferred arrangement. In such case the minute hand designations will cover every minute division in the hour or sixty different minute positions, and this will be duplicated, representing two complete revolutions of the minute hand. The remaining thirty discs may be devoted to special or extra designations. But a given minute designation will not appear with a given hour designation more than once on the discs, so that every disc will represent a different time. For instance, one disk may have the hands arranged to represent the time 12.15, another 1.16 etc.

In playing the game each player will receive one or more of the cards 1, preferably at least two, one having the columns 10–15 designated from 12 o'clock to 6 o'clock and the other having the columns designated from 6 o'clock to 12 o'clock. But in the preferred form of my invention no two cards will be the same as far as time designations of the hands are concerned. All the discs will be placed on the table face down and they are drawn one at a time. As a disc is drawn it is turned face up and the person drawing it may call out the time designation printed thereon. Let us assume that a disc is drawn having the time designation 12.15. The players will each look down their cards and in the 12–1 row 10, to ascertain whether there is a dial with the hands arranged to indicate the time 12.15 and the one finding this on his or her card receives the disc which was so drawn. This disc is then placed on the 12.15 dial. Successive discs are drawn in the same manner and are taken by the player having a corresponding time designation on their cards. The player who first has discs on every dial of a card may be considered the winner, or, the player first having discs on all the dials of a row may be considered the winner. Other ways of playing may be resorted to.

Figure 4:
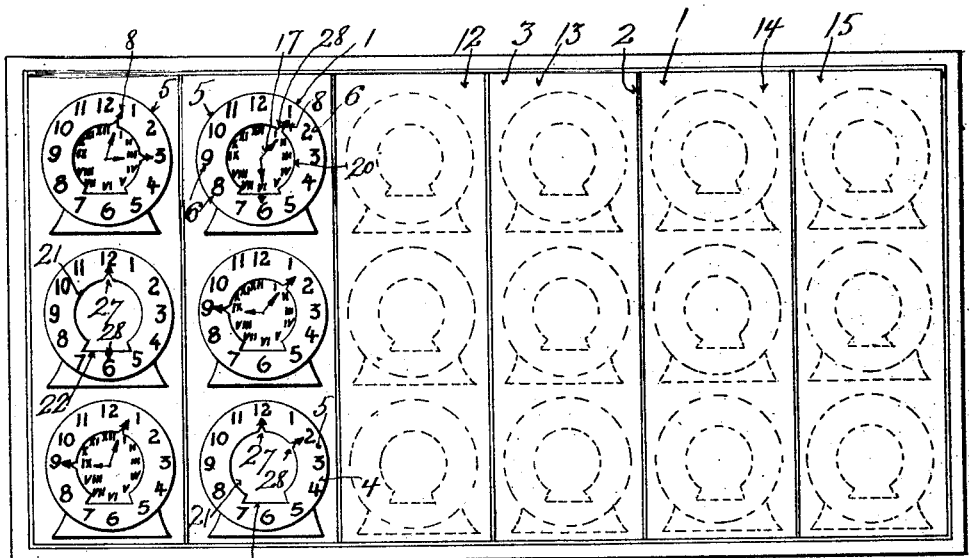
Fig. 4 shows a modification.
Figures 5, 6:
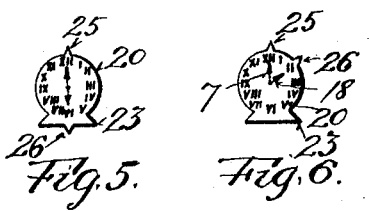
Figs. 5 and 6 show modified playing discs therefor.

In the form shown in Figures 4, 5 and 6 each disc has, in addition to an hour hand and a minute hand on one face, also a smaller dial 20 having hour markings preferably in Roman numerals in order that pupils or players may become familiar with the Roman numerals often used on clocks dials. In this form of the invention there is a key device to make certain that the disc is properly applied to the card. The card has an opening 21 to receive a disk and a key seat or recess 22 for each dial, all of which are similarly located relatively to the several dials. Each disc has a projection 23 which fits into the recess or seat 22. In addition, each disc has a projection 25 on its edge corresponding with the line of the hour hand represented on the disk and it has a similar projection 26 on its edge corresponding with the line of the minute hand represented on the disk. The card has recesses 27, 28 extending inwardly from the edge of the circular opening 21 and these receive, respectively, the projections 25 and 26 of the disk. It is understood that the key recesses 22 all appear at the same positions on the dials of the several cards whereas the recesses 27, 28 are arranged differently on each dial according to the time designation on each dial.

This form of game may be played very much like the first one. All the discs are placed face down on the table and one disc is drawn at a time and turned up. The player may read the time indicated by the hands on the disc and then look over his or her cards to see if there is a corresponding time designation formed by the hands 17, 18 or the recesses 27, 28 on one of the dials 4. And if a player finds he or she has such a designation that player receives the disc, to be placed in the proper opening 21 in the card. If a player is unable to read time that player may simply look on his or her card for a dial where the key 23 of the disc will fit the recess 22 and where the projections 25 and 26 will also fit the recesses 27 and 28. If the combination is found, that disc is placed in position on the proper card. Therefore, with this device children may play the game even before they can tell time and in playing the game they learn to tell time. The players having the corresponding time designations on their cards take the discs from time to time as they are turned up and place the discs in the openings 21 of their cards until some player has a complete row of discs in place on a card or until some player has a whole card filled.

This second form prevents errors being made in the play because there is only one place on all the cards where any given disc will fit both the key recess 22 and the recesses 27, 28.

It will be obvious that the game may be made of any desired materials and the markings may be made by printing, lithographing or by any other process.

Having described my invention, what I claim is:

1. A game comprising members such as cards having dials thereon simulating the face or dial of a time piece or clock, and playing members or discs having clock hand position indications thereon and adapted to be associated with the dial representations of said cards whereby said clock hand indications will cooperate with said dial representations to simulate different positions of the hands of a clock at different periods of time.

2. A game comprising members such as cards having dials thereon simulating the face or dial of a time piece or clock and arranged in rows on said cards, and playing members or discs having clock hand position indications thereon and adapted to be associated with the dial representations of said cards whereby said clock hand indications will cooperate with said dial representations to simulate different positions of the hands of a clock at different periods of time.

3. A game comprising members such as cards having dials thereon simulating the face or dial of a time piece or clock, said dials including hour numbers circularly disposed, and playing members or discs having clock hands indicated thereon, said discs being adapted to be placed within the circle of numbers on said dials whereby said clock hand indications will point to the numbers of said dials or to some intermediate points whereby said clock hand indications and said dials will simulate the different positions of the hands of a clock at different periods of time.

4. A game comprising members such as cards having dials thereon simulating the face or dial of a time piece or clock, and having apertures to receive discs therein, said cards having a key recess extending from the edge of said aperture, all of said key recesses being similarly disposed in relation to the dials, said cards having other recesses extending from the edge of said aperture and differently located for each dial, and playing members or discs adapted to be placed in said apertures and having a key member adapted to be received in said key recess of said card and having other edge projections adapted to register with said second mentioned recesses in said card for the purpose set forth.

Signed at the city, county and State of New York on this 27th day of June, 1925.

ISRAEL H. KAPLAN.